US012276388B2

(12) United States Patent
Gollnick et al.

(10) Patent No.: US 12,276,388 B2
(45) Date of Patent: Apr. 15, 2025

(54) HEADLAMP FOR A VEHICLE HAVING A NOVEL BASIC STRUCTURE, AND PRODUCTION METHOD

(71) Applicant: HELLA GmbH & Co. KGaA, Lippstadt (DE)

(72) Inventors: Ansgar Gollnick, Paderborn (DE); Hubertus Hering, Werl (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/512,806

(22) Filed: Nov. 17, 2023

(65) Prior Publication Data

US 2024/0084991 A1    Mar. 14, 2024

Related U.S. Application Data

(63) Continuation of application No. PCT/EP2022/061461, filed on Apr. 29, 2022.

(30) Foreign Application Priority Data

May 17, 2021 (DE) .................... 10 2021 112 674.6

(51) Int. Cl.
    *F21S 41/29*     (2018.01)
    *B60Q 1/04*      (2006.01)
    *F21S 41/20*     (2018.01)

(52) U.S. Cl.
    CPC ............ *F21S 41/29* (2018.01); *B60Q 1/0408* (2013.01); *F21S 41/28* (2018.01)

(58) Field of Classification Search
    CPC ........ F21S 41/28; F21S 41/29; B60Q 1/0408; B60Q 1/0483
    See application file for complete search history.

(56) References Cited

U.S. PATENT DOCUMENTS 5,136,482 A * 8/1992 Urbschat ................ F21S 41/39
                                            362/544
5,618,098 A * 4/1997 Naganawa ........... B60Q 1/0483
                                            362/267

(Continued)

FOREIGN PATENT DOCUMENTS

DE        1101984 B     3/1961
DE        4036031 C1    2/1992
          (Continued)

OTHER PUBLICATIONS

International Search Report dated Aug. 25, 2022 in corresponding application PCT/EP22/061461.

*Primary Examiner* — Julie A Bannan

(74) *Attorney, Agent, or Firm* — Muncy, Geissler, Olds & Lowe, P.C.

(57) ABSTRACT

A headlights for a vehicle and a method for production with at least one light module designed to emit light and with a headlight lens through which the light can be emitted from the headlight. A housing is provided which, together with the headlight lens, encloses an interior in which the at least one light module is arranged. A support unit is provided on which the light module is mounted. The support unit has a front on which a mount is arranged to accommodate the headlight lens. The support unit has a back on which the mount is arranged to accommodate the housing. The support unit has a fastener by means of which the headlight can be attached to the vehicle.

16 Claims, 2 Drawing Sheets

(56) References Cited

U.S. PATENT DOCUMENTS

| | | | | |
|---|---|---|---|---|
| 5,651,604 | A * | 7/1997 | Dobler | B60Q 1/0683 |
| | | | | 362/549 |
| 6,015,219 | A * | 1/2000 | Kelly | B60Q 1/007 |
| | | | | 362/267 |
| 6,695,396 | B1 * | 2/2004 | Schwab | B60Q 1/045 |
| | | | | 296/203.02 |
| 9,120,423 | B2 | 9/2015 | Stiller | |
| 9,284,005 | B2 * | 3/2016 | Ohashi | B62J 6/022 |
| 10,414,333 | B2 | 9/2019 | Muegge | |
| 2004/0151005 | A1 * | 8/2004 | Cramer | B60Q 1/068 |
| | | | | 362/523 |

FOREIGN PATENT DOCUMENTS

| | | |
|---|---|---|
| DE | 19950698 A1 | 4/2001 |
| DE | 10104118 A1 | 9/2002 |
| DE | 102008045764 A1 | 3/2010 |
| DE | 102010013484 A1 | 10/2011 |
| DE | 102014117842 A1 | 6/2016 |
| DE | 202016101155 U1 | 6/2017 |
| EP | 0745511 A2 | 12/1996 |
| EP | 2583884 A1 | 4/2013 |
| EP | 2781826 A1 | 9/2014 |

* cited by examiner

HEADLAMP FOR A VEHICLE HAVING A NOVEL BASIC STRUCTURE, AND PRODUCTION METHOD

This nonprovisional application is a continuation of International Application No. PCT/EP2022/061461, which was filed on Apr. 29, 2022, and which claims priority to German Patent Application No. 10 2021 112 674.6, which was filed in Germany on May 17, 2021, and which are both herein incorporated by reference.

BACKGROUND OF THE INVENTION

Field of the Invention

The invention relates to a headlight for a vehicle and to a method for producing a headlight with at least one light module designed to emit light, and wherein the headlight has a headlight lens by means of which the light from the headlight can be emitted or decoupled, wherein a housing is provided which encloses an interior with the headlight lens, in which the at least one light module is arranged, and wherein a support unit is provided on which the light module is mounted.

Description of the Background Art

Conventional headlights have a housing as a base body, which is somewhat C-shaped in cross-section and has a front opening that is closed with the headlight lens. The functional units such as a high beam module, a low beam module or, for example, a signal light module and other components such as sensors, heat sinks, electronic circuits and the like are mounted in the housing through its opening. The disadvantage is that the inside of the housing is difficult to access, so that the functional units of the headlight can only be mounted in the housing under difficult conditions. Complex assembly processes are particularly necessary for the production of bolted connections, hot-press connections or snap-in connections that require undercuts. This not only increases the assembly effort, but also the production effort of the housing, which is usually made of plastic.

The housing itself usually has attachment points that are used to attach the headlight to the vehicle. The functional units, such as the low beam module or the high beam module, are mounted in the housing, with the housing forming the load-bearing base body. Support frames can also be used, via which a low beam module, a high beam module or a signal light module can be attached to the housing, for example. The modules often have to be adjusted afterwards, or a headlight leveling system is used to adjust the cut-off line of the low beam depending on the load or driving situation of the vehicle. If the housing heats up, a temperature-related drift of the cut-off line can result, wherein it is often associated with increased difficulties in complying with limit values for the drift of the cut-off line. In addition, minimizing temperature drift requires high-quality plastics to manufacture the housing.

Newer headlight concepts make use of special support units that directly receive the light module and can themselves be attached directly to the structure of the vehicle. In this way, temperature-related distortion of the headlight housing can be eliminated from the power flow chain between the light module and the vehicle.

For example, DE 20 2016 101 155 U1 discloses a headlight for a vehicle with a light module designed to emit light, and with a headlight lens through which the light from the headlight can be emitted, wherein a housing is provided which, together with the lens, encloses an interior in which the at least one light module is accommodated. A support unit is disclosed, on which the light module is mounted and by means of which the headlight can be attached to the vehicle likewise.

The housing of the headlight is designed in such a way that the support frame pierces the inherently closed housing at several points in order to guide the fasteners to the support frame out of the housing. This forms a support unit that is in a way integrated into the housing of the headlight. Disadvantageously, however, this does not solve the disadvantages of mounting the headlight, since the housing of the headlight still has a C-shape, into which the light-forming functional units have to be integrated under poor accessibility. A particular disadvantage is that the installation can only be carried out from the opening side of the housing, which is then closed with the headlight lens. The support frame, which in the sense of the invention forms the support unit, which not only accommodates the light module, but can also be used to attach the entire headlight in the vehicle, is inseparably formed with the housing in one piece due to the overmolding of the outer areas of the support unit with the material of the housing; in any case the support unit cannot be detached from the housing. Especially in areas behind the support frame that are facing away from the headlight lens, it is extremely difficult to carry out ordinary assembly processes.

SUMMARY OF THE INVENTION

It is therefore an object of the invention to further improve a headlight with a basic structure by means of which the installation of the headlight is facilitated and which can be carried out cost-effectively. In particular, the object of the invention is to assemble the components of the headlight from only one mounting direction, as far as possible. At the same time, the assembly of the support frame with the light-relevant functional units of the headlight should be as easy as possible.

In an exemplary embodiment, the invention includes the technical teaching that the support unit has a front on which a mount for the headlight lens is arranged and that the support unit has a back on which mount for the housing is arranged, and wherein the support unit has fasteners by means of which the headlight can be attached to the vehicle.

The invention is based on the idea of providing a support unit that primarily can be freely assembled from both the front and the back.

The light module and other functional units can be freely mounted on the support unit without a disturbing housing and without an interfering headlight lens over large free areas from the front and from the back. Only then is the housing attached to the support unit from the back and finally the headlight lens from the front.

From another point of view, the support unit is therefore also assembled with the housing and the headlight lens, i.e., the housing and the headlight lens are attached to the support unit as well as the light-relevant functional units, electronic circuits, sensors and the like. The advantage lies in particular in the fact that all components in the later interior area of the headlight can first be attached to the support unit, and only as final assembly steps are the light module and the housing attached to the support unit. It does not matter whether the headlight lens and/or the housing are attached first and then the headlight lens and/or the housing are attached to the support unit.

Since the support unit forms a front and a back, the headlight lens, the support unit and the housing can also be joined together from one mounting direction each, wherein the support unit with the light-relevant functions and other components of the headlight can be provided as an individually manageable unit, so that only the housing and the headlight lens are mounted.

A special feature of the invention is that the headlight lens is no longer attached to the housing, but to the support unit. However, the basic idea of the invention does not preclude, with particular advantage, the possibility that areas of the headlight lens are also attached to the housing, wherein the housing is attached to the support unit from a back and the headlight lens from a front. This avoids the housing having a deep inner side into which the installation must take place from the opening side, which is only closed with the headlight lens at the end of the assembly sequence. Alternatively, the housing can also be attached to the support unit as a final component in order to ultimately provide the headlight in its entirety. In the sense of the invention, it is sufficient if the housing is only designed in the form of a hood and is provided free of fasteners. Since the housing for the headlight according to the invention no longer causes drift for the light functions despite its thermal expansion, it can be made of a simpler plastic material.

If the support unit is disc-shaped or if it comprises a disc-like, flat base section, the support unit forms a kind of division plane in which the arrangement of the headlight lens on the front is separated from the arrangement of the housing on the back. In this context, the headlight lens and the housing may also be at a distance from each other, in particular if the support unit also forms a section of the housing, for example with a circumferential section of the support unit, to which the headlight lens is attached at the front and the housing at the back, and which encloses the base section. The circumferential section and the base section are formed in one piece with each other and form the support unit.

In addition to the light module, a signal light module on the support unit can also be included in the headlight. Other functional units can also be arranged on the support unit, such as sensors, especially light sensors, other light modules such as high beam module, low beam module, fog light module, turning light module and the like.

The support unit can extend in one plane and, in particular, be designed as a flat body. In particular, the support unit has a contour that corresponds to the cross-sectional contour of the headlight in the plane of the arrangement of the support unit. In particular, the support unit has a base section in or to which the modules such as the light module, the signal light module and other functional units are attached, and the base section is enclosed on the edge by the circumferential section. Outside the circumferential section, the support unit has the fasteners to connect to the vehicle, such as two, three or four fasteners.

For example, the support unit can form a complete surface body equipped with openings to insert the light modules into the surface body. It is also conceivable that the support unit has a ribbed structure or a frame structure, i.e., in particular forms a ribbed body or a frame body.

The special advantage of the concept for the formation of the headlight according to the invention is the improved mounting of the components on the support unit. For example, the support unit may have openings into which modules can be snapped with locking hooks to easily provide a fastening of the modules to the support unit. Since neither the housing nor the headlight lens are already attached to the support unit, the free accessibility of the support unit is particularly advantageous for attaching the light module, the signal light module or the like, to the support unit, in particular to snap it into place, to weld it on, in particular by means of press welding or adhesive connections.

With a particular advantage, the support unit has a metallic material, for example, the support unit is manufactured by means of a metal die-casting, in particular an aluminum die-casting, or the support unit is formed by means of one or more interconnected sheet metal elements produced by a stamping-bending process.

The support unit can form a structural component of the vehicle, so that forces can be transmitted through the support unit and thus also through the headlight, for example from the lock carrier of the vehicle into the wider frame of the vehicle. Thus, different fasteners on the support unit can be attached to different components of the vehicle, and different structural components of the vehicle are structurally connected to each other by means of the support unit of the headlight. As a result, the headlight can be further developed as a force-absorbing structural component of a vehicle.

The mount for attaching the headlight lens and/or the housing to the support unit can be designed, for example, as a circumferential groove for holding an adhesive or as a spring for insertion into the adhesive, the latter for example if a circumferential section or collar of the support unit is designed to complement the circumferential groove.

For this purpose, the mount is known to form a circumferential groove that can be filled with adhesive in order to subsequently dip a circumferential edge into the adhesive, for example of the headlight lens, which is also referred to as the plastic cover lens, or the back housing. After the adhesive has hardened, a particularly media-tight connection is created between the support unit and the headlight lens or the housing. When connecting the support unit to the headlight lens or to the housing, it can be left undecided whether the mount is the circumferential groove or a circumferential edge inserted into the groove, which is then filled with adhesive. For example, the housing can also have a mount that can be filled with adhesive in order to then insert a circumferential edge, in particular the circumferential section of the support unit, into the circumferential groove.

The advantage of the headlight concept is achieved in particular by the fact that the light module and/or the signal light module and/or other functional units can be connected to the support unit from the front or back. Finally, as final steps, the headlight lens and housing are attached to the support unit, wherein the fastening can be carried out in the same way as, for example, the fastening of a light module, a signal light module or other functional units. It is crucial that the lens and/or housing are the last component to be fastened to the support unit.

Another advantage of the headlight is that it has a center of gravity that coincides with a pivot point of the light module, in which the light module is attached to the support unit in such a way that the pivot point of the light module coincides with the center of gravity. In particular, the center of gravity is designed in such a way that it lies in the support unit. As a result, vibrations and acceleration forces on the headlights do not cause any deviation of the light module or, for example, the signal light module.

In particular, it is advantageous that, with reference to a preferred installation position of the headlight, a first fastener is placed above and a second fastener below the external dimensions of the lens and/or the outside of the housing, or a fastener is arranged in a lateral arrangement next to the headlight lens and/or next to the housing, so that this fastener protrudes beyond the lateral extension of the headlight lens and the housing, and can be advantageously attached to a headlight mount of the vehicle.

The invention also focuses on a method for the manufacture of a headlight which is carried out according to the above description, wherein the method comprises at least the following steps: Providing the support unit with one front and one back; Arranging the light module and/or signal light module and/or other functional units from the front or back to the support unit; Attaching the headlight lens to the front of the support unit and/or attaching the housing to the back of the support unit. The headlight lens or housing can be installed in any order, depending in particular on the direction of mounting and the mount.

For example, it is conceivable that after the support unit has been assembled with all light functions and electrical functions, the housing is held in a holding device, so that after an adhesive has been applied to the mount between the support unit and the housing, the support unit is attached to the housing. In a further assembly step, the headlight lens is then attached to the support unit, in particular also after application of an appropriate adhesive in a mount between the support unit and the headlight lens. Finally, it is also possible to assemble the support unit with an assembly machine, so that the support unit is held in a fixture, and as final assembly steps, the headlight lens and the housing are arranged on the support unit and, in particular, glued on.

The advantage here is that the three components housing—support unit—headlight lens can be joined from a single mounting direction. However, if the support unit is considered individually and it is clamped and loaded in a placement system, a first mounting direction from the front and a second mounting direction from the back can be used to install the lighting and electrical functions on the support unit and finally to attach the housing from the mounting direction from the back and the headlight lens from the mounting direction from the front as the last components on the support unit. After completion of the joints, especially by means of the adhesive, the headlight is finished. This avoids the insertion of components and units into the interior of a housing and makes assembly much easier due to the good accessibility of the front and back of the support unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
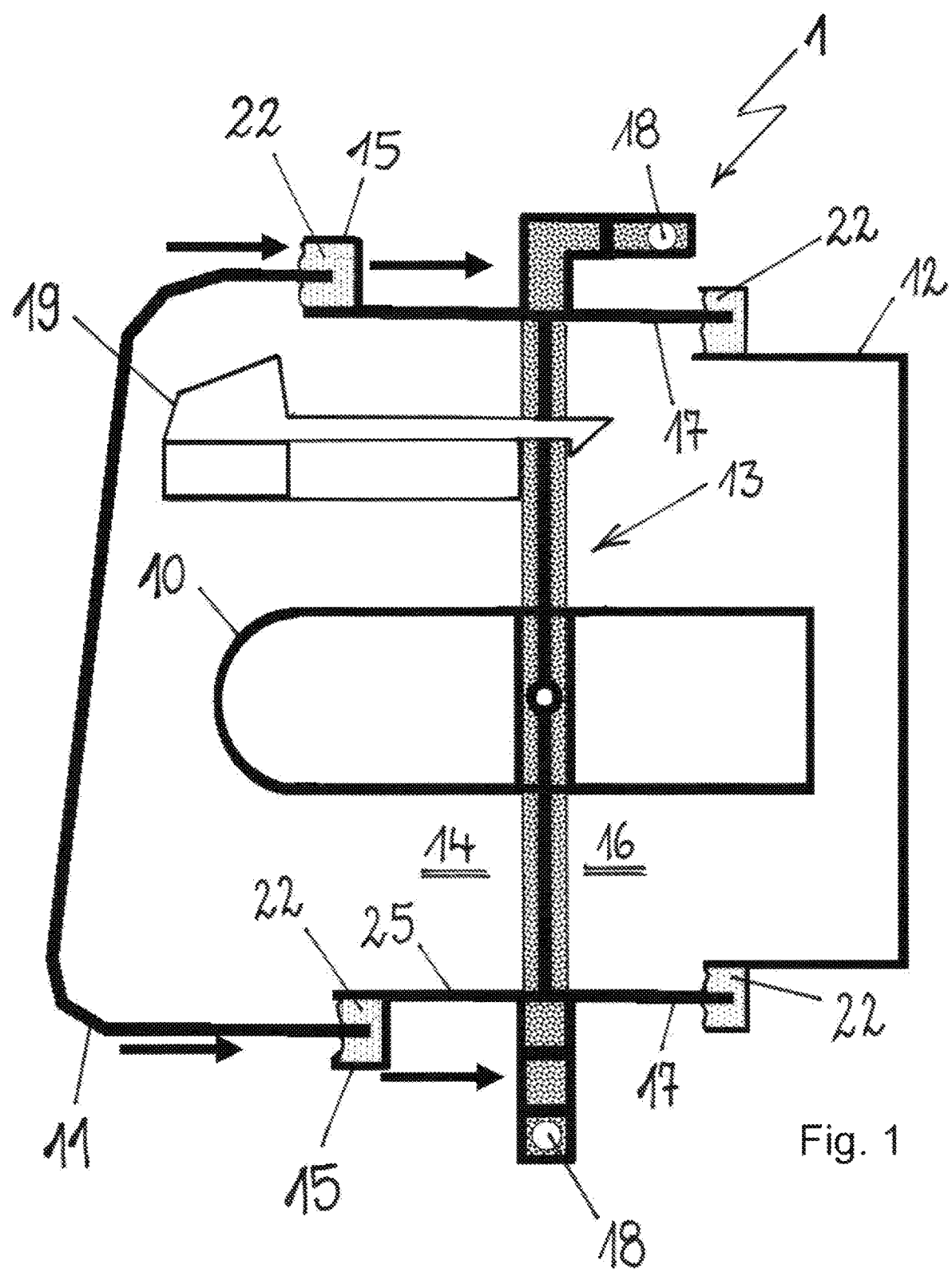
FIG. 1 shows a schematic view of the headlight according to the novel basic structure.

FIG. 1 shows a schematic view of the headlight 1 with the novel basic structure according to the invention. The base body of the headlight 1 is the support unit 13, which can be fixed in the structure of a vehicle with fasteners 18. All other components of the headlight 1 are mounted on the support unit 13, in particular the headlight lens 11 from the front 14 and the housing 12 from the back 16. This means that it is no longer the housing 12 that forms the base body and thus the mounting structure for the functional units in the headlight 1, but instead it is the support unit 13. Due to the novel structure of the headlight 1, the housing 12 is reduced in size and only covers the back 16 of the support unit 13, whereas the headlight lens 11 covers the front 14 of the support unit 13.

In order to ensure that the headlight lens 11 is connected in a particularly media-tight manner, the support unit 13 has a mount 15 which is filled with adhesive 22, and the outer edge of the headlight lens 11 can be inserted into the adhesive 22 of the mount 15 in order to establish the connection after the adhesive 22 has hardened. Furthermore, the support unit 13 has a mount 17 in the form of the outer edge of a circumferential section 25, which can be immersed in adhesive 22, which is received in a corresponding groove on the housing 12.

The mounting arrows outside the headlight 1 show a mounting direction exclusively from the left, so that, for example, the housing 12 can be clamped in a socket in order to then attach the ready-made support unit 13 with the light module 10 to the signal light module 19 and other components to the housing 12 by means of the mount 17.

Subsequently, the headlight lens 11 can be attached to the support unit 13 from the same mounting direction. Of course, it is also possible to arrange the circumferential grooves of the mount 15 on the other components, so that, for example, the headlight lens 11 is first received in a fixture and then the support unit 13 and finally the housing 12 is mounted.

For example, the support unit 13 is designed in the form of a flat body and the light module 10 and, for example, the signal light module 19 can be clipped, glued or connected in any other way from the front 14 and the back 16 to the support unit 13. The advantage here is the free accessibility of the mounting surfaces from the front 14 and the back 16 of the support unit 13, as shown in FIG. 2 below.

Figure 2:
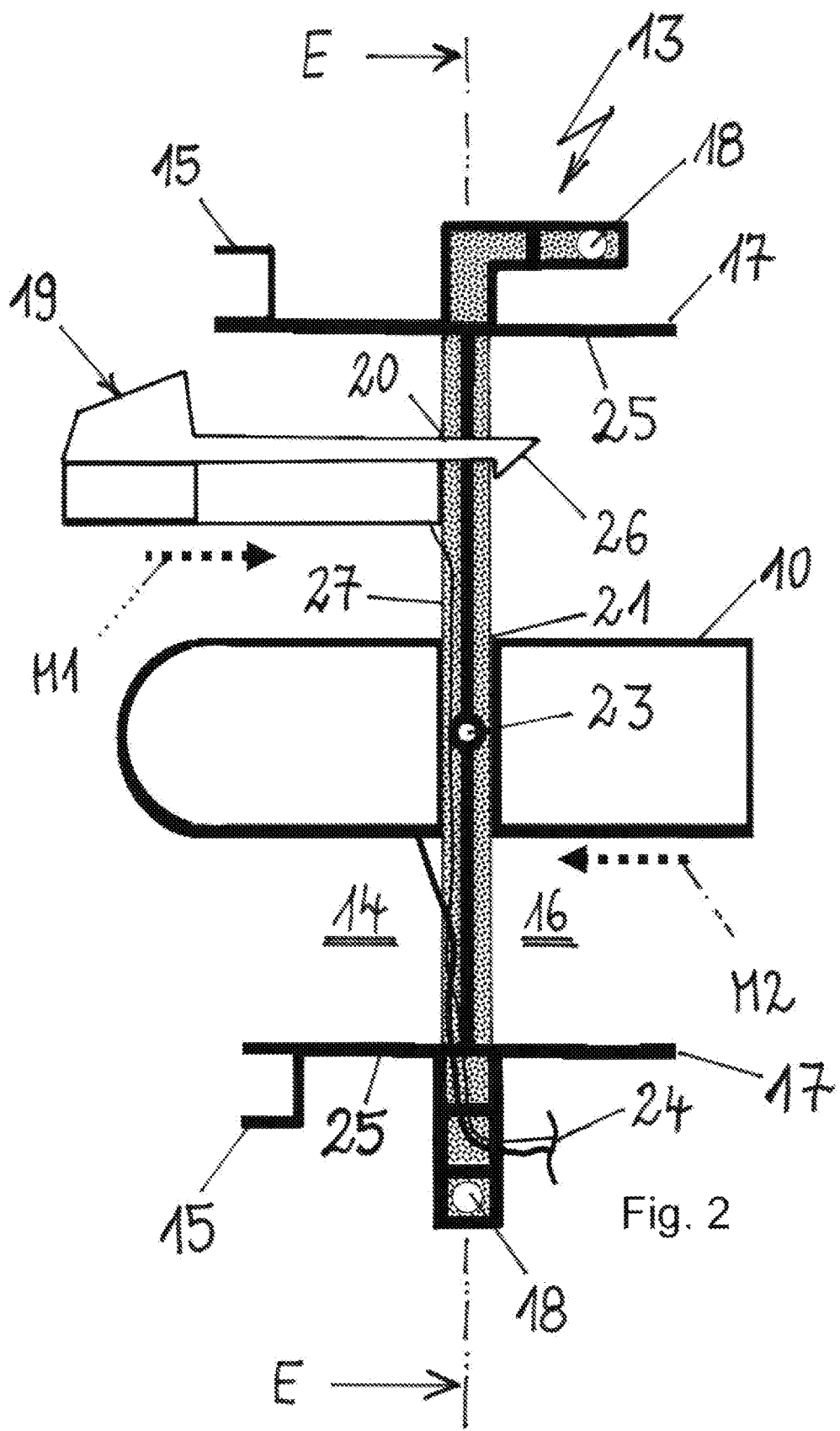
FIG. 2 shows a view of the support unit with light functions and electrical functions.

FIG. 2 shows the support unit 13 without the arrangement of the headlight lens 11 and without the arrangement of the housing 12 on the support unit 13. The support unit 13 extends in a division plane E and thus separates a front 14 from a back 16. For example, the front 14 is the side from which the light from the headlight can exit and points in the direction of travel.

The support unit 13 has a flat base section 27 with corresponding openings 20 and 21, shown by way of example to accommodate the signal light module 19 and the light module 10, the latter of which can form, for example, the low beam module and/or the high beam module of the headlight. The base section 27 is bordered on the outside by a circumferential section 25, which also forms a section of the outer shell of the headlight 1 between the headlight lens 11 and the housing 12, see FIG. 1.

On the circumferential section 25, on the front 14 and on the back 16 respectively, the mount 15 and 17 are formed, wherein the mount 15 on the front 14 is formed by the circumferential groove to hold the adhesive, and on the back 16 the mount 17 forms only the complementary shaped spring for connection with the groove, which is therefore formed on the housing 12.

Due to the freely accessible front 14 and back 16, mounting directions in M1 and M2 can be defined, so that, for example, the light module 10 can be mounted from the back 16 and the signal light module 19 from the front 14. Of course, only one mounting direction can be provided, so that the support unit 16 with all functional units can be assembled either only from direction of the front 14 or only from the direction of the back 16.

The support unit 13 is also designed to accommodate electrical conductors 24, which can be particularly advantageously routed out within the support unit 13 into the area outside the circumferential section 25. For the attachment of the headlight 1 to the vehicle, the fasteners 18 are shown only by way of example in the form of fastening eyes, and the attachment to the vehicle can also be carried out by using other intermediate elements, so that the support unit 13 does not have to be attached directly to the vehicle structure, but other means can be used for this purpose, so that indirect fastening with fasteners 18 is also included in this respect.

The openings 20, 21 in the support unit are designed in such a way that, for example, locking hooks 26 can be used, as shown in connection with the signal light module 19 by way of example. For example, the signal light module 19 can be easily snapped from the front 14 to the support unit 13. The same applies to the light module 10, wherein the fastening is not shown in detail, and the support unit 13 may be designed in particular to use hot-press connections in addition to the use of screw connections or rivet connections in order to accommodate corresponding modules for the light function or other functional units.

If the support unit 13 is fully assembled, the headlight can be completed with the arrangement of the housing and the headlight lens. When the headlight is completed, the support unit 13 forms a division plane E, and the center of gravity 23 lies in the support unit 13 and coincides in particular with the point by which the light module 10 can be swiveled or adjusted, for example, for headlight leveling or the like on the support unit.

The invention is not limited in its execution to the preferred embodiment given above. Rather, a number of variants are conceivable, which makes use of the solution presented even in the case of fundamentally different designs. All features and/or advantages arising from the claims, description or drawings, including design details, spatial arrangements and method steps, may be essential to the invention either on their own or in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlight for a vehicle, the headlight comprising:
   at least one light module designed to emit light;
   a headlight lens through which the light from the headlight is adapted to be emitted;
   a housing, which, together with the headlight lens, encloses an interior in which the at least one light module is arranged; and
   a support unit on which the at least one light module is mounted, the support unit having a front on which a first mount is arranged to receive the headlight lens, the support unit having a back on which a second mount is arranged to receive the housing, and the support unit having at least two fasteners via which the headlight is attached to the vehicle,
   wherein the second mount is inserted into a groove of the housing, and
   wherein, with reference to a predetermined installation position of the headlight, a first fastener of the at least two fasteners is arranged above external dimensions of at least one of the headlight lens or the housing and a second fastener of the at least two fasteners is arranged below the external dimensions of the at least one of the headlight lens or the housing, or wherein one of the at least two fasteners protrudes laterally over at least one of the lens or the housing.

2. The headlight according to claim 1, wherein the support unit extends in a division plane in which the arrangement of the headlight lens on the front is separated from the arrangement of the housing on the back.

3. The headlight according to claim 1, wherein at least one signal light module is mounted on the support unit.

4. The headlight according to claim 1, wherein the support unit extends in a division plane and forms a flat or a predominantly flat body.

5. The headlight according to claim 1, wherein the support unit forms a ribbed body or a frame body and has a plane-like base section enclosed by a circumferential section.

6. The headlight according to claim 3, wherein the support unit has openings in which at least one of the at least one light module, the at least one signal light module or other functional units of the headlight are at least partially inserted.

7. The headlight according to claim 1, wherein the support unit has a metallic material.

8. The headlight according to claim 1, wherein the first mount and the second mount are designed to receive an adhesive or to be placed into an adhesive.

9. The headlight according to claim 6, wherein the at least one of the at least one light module, the at least one signal light module or the other functional units are joined to the support unit from the front or from the back.

10. The headlight according to claim 1, wherein the headlight has a center of gravity which coincides with a pivot point of the at least one light module, and wherein the center of gravity lies in an area of the support unit.

11. The headlight according to claim 1, wherein the support unit is designed to form a structural component of the vehicle.

12. A method for producing the headlight according to claim 1, the method comprising:
   providing the support unit with the front and the back and the at least two fasteners;
   arranging at least one of the at least one light module, at least one signal light module or other functional units to the support unit from the front or from the back; and
   attaching the headlight lens to the front of the support unit and attaching the housing to the back of the support unit, wherein the second mount of the support unit is inserted into a groove of the housing.

13. The method according to claim 12, wherein electrical conductors are arranged on the support unit for an electrical connection of the at least one of the at least one light module, the at least one signal light module or the other functional units from a first mounting direction from the front or from a second mounting direction from the back.

14. The method according to claim 12, wherein the headlight lens is attached to the front of the support unit from a first mounting direction and the housing is attached to the back of the support unit from a second mounting direction.

15. The headlight according to claim 5, wherein the second mount is an outer edge of the circumferential section.

16. The headlight according to claim 1, wherein the first mount includes a groove, and wherein an outer edge of the headlight lens is inserted into the groove of the first mount.

* * * * *